United States Patent
Vallee et al.

(10) Patent No.: US 9,699,190 B2
(45) Date of Patent: Jul. 4, 2017

(54) METHOD AND DEVICE FOR THE CONNECTION TO A REMOTE SERVICE

(71) Applicants: Florian Vallee, Colombes (FR); Nicolas Bousquet, Colombes (FR)

(72) Inventors: Florian Vallee, Colombes (FR); Nicolas Bousquet, Colombes (FR)

(73) Assignee: OBERTHUR TECHNOLOGIES, Colombes (FR)

(*) Notice: Subject to any disclaimer, the term of this patent is extended or adjusted under 35 U.S.C. 154(b) by 38 days.

(21) Appl. No.: 14/543,003

(22) Filed: Nov. 17, 2014

(65) Prior Publication Data
US 2015/0143464 A1  May 21, 2015

(30) Foreign Application Priority Data
Nov. 19, 2013  (FR) .................................... 13 61361

(51) Int. Cl.
*H04L 29/00*    (2006.01)
*H04L 29/06*    (2006.01)
*H04L 12/24*    (2006.01)
*H04L 29/08*    (2006.01)
*H04W 12/08*    (2009.01)

(52) U.S. Cl.
CPC .............. *H04L 63/10* (2013.01); *H04L 41/12* (2013.01); *H04L 63/0853* (2013.01); *H04L 63/0884* (2013.01); *H04L 67/02* (2013.01); *H04L 67/141* (2013.01); *H04L 67/16* (2013.01); *H04L 67/34* (2013.01); *H04W 12/08* (2013.01); *H04L 63/0281* (2013.01)

(58) Field of Classification Search
CPC . H04L 63/10; H04L 63/0853; H04L 63/0281; H04L 63/0884; H04L 67/16; H04L 67/02; H04L 67/141; H04L 67/34; H04L 41/12; H04W 12/08

See application file for complete search history.

(56) References Cited

U.S. PATENT DOCUMENTS 9,092,635 B2* 7/2015 Ali .......................... G06F 21/34
2002/0013807 A1 1/2002 Richard
(Continued)

FOREIGN PATENT DOCUMENTS

EP    1 578 064 A1   9/2005
FR    2 968 494 A1   6/2012
(Continued)

OTHER PUBLICATIONS

French Search Report dated Jul. 8, 2014 in French Priority Application FR 1361361.

*Primary Examiner* — Don Zhao
(74) *Attorney, Agent, or Firm* — Young & Thompson (57) ABSTRACT

The present invention relates to the field of the connection to a secure remote service from a terminal and notably of the establishment of a connection between the secure remote service and a security device connected to the terminal. A security device including a security element is connected to the terminal via a physical or virtual local network. When trying to access a secure remote service, a software module is automatically downloaded onto the terminal, without requiring particular rights, from the secure remote service for the discovery and the interaction with the security device. In this way, it is not necessary to install drivers or other specific software in order to enable the use of the secure element when trying to access a secure remote service.

10 Claims, 3 Drawing Sheets

(56) References Cited

U.S. PATENT DOCUMENTS

| | | | | |
|---|---|---|---|---|
| 2004/0249907 | A1* | 12/2004 | Brubacher | H04L 41/0816 709/220 |
| 2005/0021725 | A1* | 1/2005 | Lobbert | H04W 48/16 709/223 |
| 2005/0097087 | A1* | 5/2005 | Punaganti Venkata | H04L 69/08 |
| 2006/0233166 | A1* | 10/2006 | Bou-Diab | H04L 63/08 370/389 |
| 2007/0039039 | A1* | 2/2007 | Gilbert | G06F 21/6218 726/4 |
| 2009/0080453 | A1* | 3/2009 | Stirbu | H04L 12/2834 370/433 |
| 2010/0186076 | A1* | 7/2010 | Ali | G06F 21/34 726/9 |
| 2011/0264905 | A1* | 10/2011 | Ovsiannikov | H04L 29/08792 713/151 |
| 2012/0143937 | A1* | 6/2012 | Boisde | H04L 67/02 709/201 |
| 2012/0182939 | A1* | 7/2012 | Rajan | A61B 5/0008 370/328 |
| 2013/0080507 | A1* | 3/2013 | Ruhlen | H04L 67/16 709/203 |
| 2013/0170502 | A1* | 7/2013 | Chen | H04L 63/0272 370/401 |
| 2015/0128116 | A1* | 5/2015 | Chen | G06F 8/10 717/154 |

FOREIGN PATENT DOCUMENTS

| | | | |
|---|---|---|---|
| WO | 2005/104441 | A1 | 11/2005 |
| WO | 2010/017828 | A1 | 2/2010 |

* cited by examiner

METHOD AND DEVICE FOR THE CONNECTION TO A REMOTE SERVICE

The present invention relates to the field of the connection to a secure remote service from a terminal and notably of the establishment of a connection between the secure remote service and a security device connected to the terminal.

BACKGROUND OF THE INVENTION

Secure remote services accessible from a consultation terminal are on the increase. These secure remote services are typically services available over the Internet communications network but are not limited to this communications network. These secure remote services are generally used from a consultation terminal also connected to this network. This terminal may be a personal computer, a mobile telephone of the intelligent type (known as a smartphone), a tablet which is a personal computer comprising a touch-screen and typically with no keyboard, or any other type of terminal connected to a communications network and allowing a user to interact with the secure remote service.

The secure remote service is a set of software applications hosted on one or more servers. This set of software applications is programmed to receive requests coming from the consultation terminal and to respond to them so as to supply the secure remote service in question. The protocol allowing the exchanges between the consultation terminal and the secure remote service is typically the HTTP (for Hyper Text Transfer Protocol) protocol and the associated protocols such as HTTPS for the secure version. This then leads to the concept of WEB service or site. Other communication protocols that can be proprietary can also be used.

The secure remote service can be authenticated in the sense that it requires the user of the consultation terminal to authenticate him/herself in order to be able to access the service. In this case, the secure remote service typically comprises a database of registered users. During the use of the secure remote service, the user is invited to supply one or more pieces of authentication information aimed at allowing the access to be linked to one of the registered users. The authentication may be based on the input by the user of a name and an associated password which will be sent to the secure remote service. The authentication is then valid if the password corresponds to that recorded for the corresponding name in the database of users of the secure remote service. Stronger authentication systems can be used, such as the systems based on biometric data such as the recognition of a finger print or of the iris of the eye or other characteristics. It is also possible to use numerical digital certificates based on a cryptographic system, each certificate comprising a public key and a private key. The authentication is referred to as 'multi-factor' if it requires at least two pieces of authentication information typically belonging to two different categories. For example, it is possible to associate a password and a fingerprint.

The communications between the consultation terminal and the secure remote service may be cleartext, in other words the information is transmitted as is. It may also be encrypted. The encryption may be based on the knowledge of a shared secret, for example DH (Diffie-Hellman) or DES (for Data Encryption Standard), between the consultation terminal and the secure remote service used to encrypt and to decrypt transmitted information, or based on the system of digital certificates using private and public keys. There is then the concept of asymmetric encryption, for example RSA (Rivest, Shamir and Adleman). When the encryption is such that it guarantees that a third party on the information channel is incapable of gaining knowledge of the information exchanged nor of modifying or of inserting information into the data stream being exchanged, this includes the concepts of encrypted tunnel or of virtual private network (or VPN). Indeed, in this case, everything happens as though a single physical link were being used for the communication between the two entities exchanging encrypted information.

Cryptographic systems including digital certificates may be implemented by secure elements that can take the form of specialized circuits protected against attack. These secure elements generally take the form of a smartcard or of a specialized circuit of the same type as the chip of the smartcard integrated into the circuit of a data processing device.

A known solution is to use a smartcard containing, for example, a digital certificate for authenticating itself and/or encrypting the communication between a consultation terminal and a secure remote service. Typically, the smartcard is introduced into a card reader connected to the terminal. However, this solution typically involves the installation of specific drivers on the consultation terminal. Moreover, the installation and the configuration of specific software applications (or 'middleware') are also often necessary. Aside from the fact that the user does not always have the rights necessary for these installations on the user terminal for security reasons, the latter often sees these operations as complex, problematic and intrusive.

SUMMARY OF THE INVENTION

The aim of the present invention is to overcome the aforementioned drawbacks. According to the invention, a security device comprising a security element is connected to the terminal via a local network, physical or virtual. When trying to access a secure remote service, a software module is automatically downloaded onto the terminal, without requiring any particular user rights, from the secure remote service for the discovery of and the interaction with the security device. In this way, it is not necessary to install drivers or other specific software in order to allow the use of the secure element when trying to access a secure remote service.

The invention relates to a method for establishing a connection between a security network service hosted by a security device connected to a consultation terminal and a remote service during the consultation of said remote service by said consultation terminal, characterized in that it comprises the following steps: a step for transmission of a discovery software module by the remote service to the consultation terminal, in response to a request sent by said consultation terminal; a step for discovering, by the received discovery software module executed on said consultation terminal, for at least one security network service available on a local network; a step for establishing a first connection, by the received discovery software module executed on said consultation terminal, between the latter and the security network service; and a step for establishing a second connection, by the received discovery software module executed on said consultation terminal, between the latter and the remote service, the discovery software module then serving as a relay between the first and the second connection so as to establish a tunnel between the remote service and the security network service.

Thus, it is possible to render secure the access to a remote service with a security device while minimizing the impact on the user experience.

According to one particular embodiment of the invention, the method furthermore comprises, by the received discovery software module executed on said consultation terminal: a step for sending a list of the security network services discovered to the remote service; and a step for receiving information designating a security network service selected by said remote service from amongst this list, the first connection then being established with the selected security network service.

Thus, the service can choose the security device to be used if there are several of them.

According to one particular embodiment of the invention, the method furthermore comprises, by the received discovery software module executed on said consultation terminal: a step for validating the network services discovered by trying to connect to these security network services.

Thus, the correct operation of the network services having responded is verified.

According to one particular embodiment of the invention, the method furthermore comprises, by the received discovery software module executed on said consultation terminal: a step for receiving a set of parameters during said attempt to connect to these security network services by the discovery software module; and a step for adding the received parameters to the list of the security network services discovered.

Thus, parameters for the connection between the remote service and the security device can be determined.

According to one particular embodiment of the invention, the list of the security network services discovered sent to the remote service is reduced to only the validated network services.

Thus, the remote service cannot select an invalid network service.

According to one particular embodiment of the invention, the method furthermore comprises, by the received discovery software module executed on said consultation terminal: a step for local storage on the terminal of the parameters for establishing first and second connections.

Thus, it is possible to restore the connection without repeating the discovery steps.

According to one particular embodiment of the invention, the first and second connections established by the received discovery software module executed on said consultation terminal are encrypted.

Thus, the security of the communication between the remote service is improved.

According to one particular embodiment of the invention, the method furthermore comprises: a step for encrypting from end to end the first and second connections by the remote service and the network service.

Thus, the security is improved, even if the terminal had just been corrupted by malicious software.

According to one particular embodiment of the invention, the step for transmission of the discovery software module comprises: a step for insertion of this module into a WEB page in the form of an interpreted program.

Thus, the transfer is automatic and transparent for the user.

According to one particular embodiment of the invention, the module is inserted into a hidden frame.

Thus, the connection established becomes resistant to a change of page of the user.

According to one particular embodiment of the invention, the step for transmission of the discovery software module comprises: a step for transmission of this module in the form of a extension module or plugin for a WEB browser.

Thus, any restrictions applied to a module in interpreted language, typically in the access to the local networks, can be circumvented.

According to one particular embodiment of the invention, the security network service is hosted on a mobile telephone.

The invention also relates to a device for hosting a service characterized in that it comprises: a discovery software module; means for transmitting the discovery software module to a consultation terminal in response to a request for access received from said consultation terminal; the discovery software module comprising and designed to be executed on the terminal: means for discovering at least one security network service available on a local network; means for establishing a first connection with the security network service; and means for establishing a second connection with the hosted service, the discovery software module then serving as a relay between the first and the second connection so as to establish a tunnel between the remote service and the security network service.

According to one particular embodiment of the invention, the device furthermore comprises, within the discovery software module: means for sending a list of the security network services discovered to the remote service; and means for receiving information designating a security network service selected by said remote service from amongst this list, the first connection then being established with the selected security network service.

According to one particular embodiment of the invention, the device furthermore comprises, within the discovery software module: means for validating network services discovered by trying to connect to these security network services.

The invention also relates to a computer program comprising instructions designed for the implementation of each of the steps of the method according to the invention when said program is executed on a computer.

The invention also relates to a means for storing information, removable or otherwise, partially or totally readable by a computer or a microprocessor comprising code instructions of a computer program for the execution of each of the steps of the method according to the invention.

In one particular embodiment, the various steps of the aforementioned method are determined by instructions of computer programs.

Accordingly, the invention is also aimed at a computer program on an information medium, this program being able to be implemented by a microprocessor, this program comprising instructions designed for the implementation of the steps of the method such as mentioned hereinabove.

This program may use any given programming language, and be in the form of source code, object code, or of code intermediate between source code and object code, such as in a partially compiled form, or in any other given desired form.

The invention is also aimed at an information medium readable by a microprocessor, and comprising instructions of a computer program such as mentioned hereinabove.

The information medium may be any given entity or device capable of storing the program. For example, the medium may comprise a storage means, such as a ROM, for example a microcircuit ROM, or else a means of magnetic recording, for example a hard disk, a flash memory or alternatively a means for optical recording, for example a CD, DVD or Blu-ray.

On the other hand, the information medium may be a transmissible medium, such as an electrical or optical signal, which can be channeled via an electrical or optical cable, by radio or by other means. The program according to the invention may, in particular, be uploaded onto a storage platform of a network of the Internet type.

Alternatively, the information medium may be an integrated circuit into which the program is incorporated, the circuit being designed to execute or to be used in the execution of the method in question.

The aforementioned information medium and computer program have characteristics and advantages analogous to the method that they are implementing.

BRIEF DESCRIPTION OF THE DRAWINGS

Other features and advantages of the invention will become more clearly apparent in the description hereinafter.

In the appended drawings, presented by way of non-limiting examples.

DETAILED DESCRIPTION OF THE PREFERRED EMBODIMENTS

Figure 1:
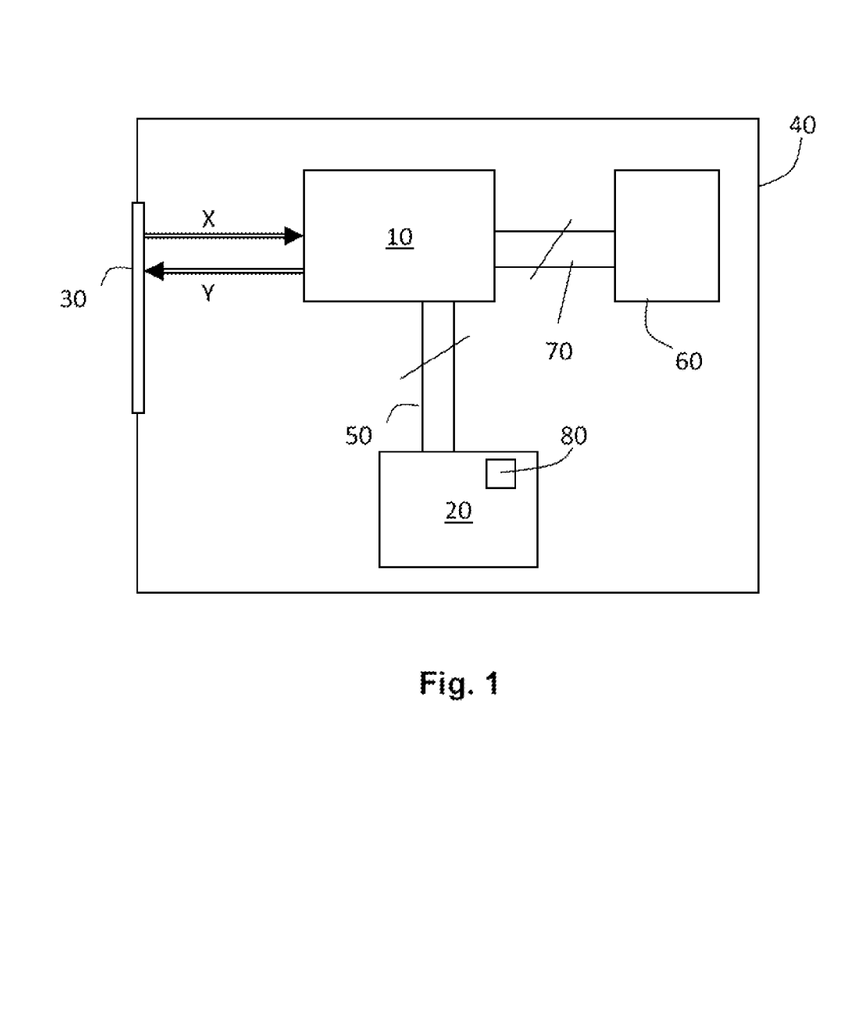
FIG. 1 shows schematically a data processing device implementing a secure element.

FIG. 1 shows schematically a data processing device 40 implementing a secure element. This device 40 comprises a microprocessor 10, with which is associated, on the one hand, a volatile memory 60, for example by means of a bus 70, and on the other, a non-volatile memory 20 (for example of the EEPROM type), for example through a bus 50.

The data processing device 40, and to be precise the microprocessor 10 that it incorporates, can exchange data with external devices by means of a communications interface 30.

Shown schematically in FIG. 1 is the transmission of an input data value X received from an external device (not shown) and transmitted from the communications interface 30 to the microprocessor 10. In a similar manner, the transmission is shown of an output data value Y from the microprocessor 10 to the communications interface 30 destined for an external device. This output data Y comes from the processing of data by the microprocessor 10, generally on the input data X with the aid of a secret data value 80 internal to the system, for example a private key.

Although, for the illustration, the input data and the output data are shown on two different arrows, the physical means which enable the communication between the microprocessor 10 and the interface 30 could be formed by a single means, for example a serial communications port or a bus.

The microprocessor 10 is capable of executing a software application (or computer program) which allows the data processing device 40 to execute a method according to the invention, examples of which are given in the following part. The software is composed of a series of instructions for controlling the microprocessor 10 which are for example stored in the memory 20.

As a variant, the assembly microprocessor 10—non-volatile memory 20—volatile memory 60 may be replaced by an application specific circuit that then comprises means for implementing the various steps of the data processing method.

Figure 2:
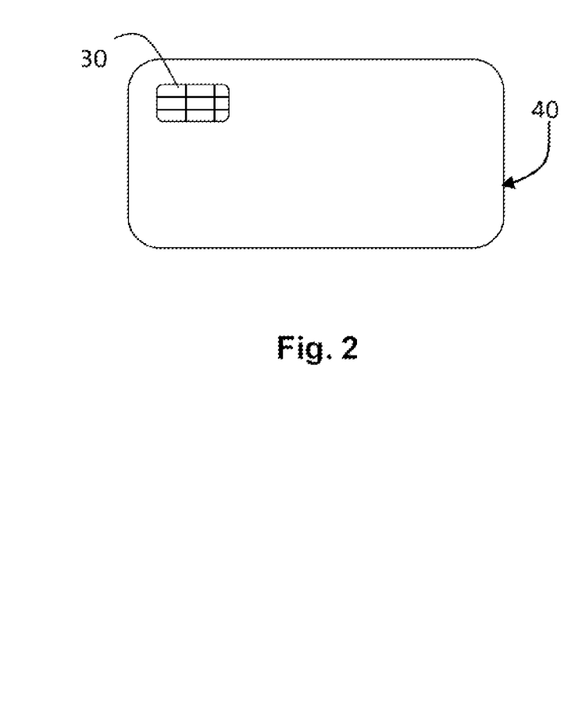
FIG. 2 shows a smartcard which constitutes one example of data processing device including a security element such as shown in FIG. 1.

FIG. 2 shows a smartcard which constitutes one example of a data processing device including a security element such as shown in FIG. 1. The communications interface 30 in this case is formed by means of the contacts of the smartcard. The smartcard incorporates a microprocessor 10, a volatile memory 60 and a non-volatile memory 20 as is shown in FIG. 1.

This smartcard conforms for example to the ISO 7816 standard and is equipped with a secure microcontroller which encompasses the microprocessor (or CPU) 20 and the volatile memory 60.

As a variant, the data processing device may be a USB stick, a paper document or information medium comprising, in one of its sheets, a microcircuit associated with contactless communication means. It is preferably a portable or pocket electronic entity. It may also be a circuit dedicated to security (a secure element) that can be directly integrated into a device, for example soldered into a mobile telephone.

When a consultation terminal tries to establish a connection to a secure remote service, generally speaking, one aspect of the invention consists in supplying a software module to said terminal by said service. This software module is accordingly downloaded automatically by the consultation terminal and executed. The function of this software module is to launch a search on the local network or networks to which the consultation terminal is connected. The aim of this search is to discover the security device or devices connected to these local networks or, more precisely, security network services hosted by the security device. A network service is a set of functionalities offered by a node of the network. This service is typically identifiable by a name. It also has capacities for identifying itself on the network in response to a discovery request. The list of the security network services discovered is then transmitted to the secure remote service which selects one of them. The communication is then established between the secure remote service and the security network service integrated into the security device via the software module downloaded onto the security terminal so as to establish a tunnel. This tunnel can advantageously be encrypted from end to end by the remote service and the network service of the security device. This tunnel is subsequently used according to the needs of the secure remote service, typically for the authentication or the encryption of the communications between the consultation terminal and the secure remote service.

The security device incorporates a security element such as that described in FIG. 1 which typically implements a cryptographic system and at least one digital certificate associated with the user of the secure remote service. The security element may also take the form of a smartcard such as that illustrated in FIG. 2. This smartcard can be inserted into the security device in a card reader. It may also be connected to this device for example by a wireless link of the NFC type. It also incorporates at least one means for establishing a connection to a local network in order to enable a communication with the consultation terminal. This local network may for example be established over a wired link connecting the device directly to the terminal. For example, it may be connected via a serial link of the USB (for Universal Serial Bus) type. It may also be a wired link allowing the connection to a local network to which the terminal is also connected, for example an Ethernet link or else an IEEE 1394 link or other link. A radio link may also be used, for example of the Bluetooth or Wifi type or else a near field connection of the NFC (for Near Field Communication) type. Irrespective of the physical link established, a communications network typically of the IP (Internet Protocol) type is established over this physical link in order to enable the communication between the terminal and the security device by means of the protocols that are commonly used over this type of network. In particular, the discovery protocols of the SSDP (Simple Service Discovery Protocol) type integrated into the UPnP (Universal Plug and Play) standard or alternatively DNS-SD (Domain Name Service based Service Discovery) defined by the RFC 6763 are implemented within the security device. The WEB communications protocols such as HTTP or HTTPS are also typically implemented within the security device. These protocols are given by way of examples and other protocols may be used for performing the same functions.

When the security device is connected to the terminal or to the local network to which the terminal is also connected, its connection network is automatically configured. This configuration can, for example, be carried out by virtue of an automatic configuration protocol such as the Zeroconf protocol defined by the RFC 5889. The configuration may also be obtained from a DHCP (Dynamic Host Control Protocol) configuration server available over the local network or even directly on board the security device. The latter therefore exists on the local network as a network node that can communicate with the consultation terminal and can do this without any intervention of the user.

The security device also implements a security network service allowing the security demands of the secure remote service to be satisfied. This security network service typically implements the authentication and/or encryption functions required for the security needs of the secure remote service. For this purpose, it typically relies on the cryptographic system incorporated into the secure element of the security device.

The access to the secure remote service is gained from a software client on the consultation terminal. This client is typically a WEB browser but may also be any type of software allowing a communication with the secure remote service. When this client tries to access the secure remote service or certain functionalities of the service which require security needs, a software module is then offered to the client by the secure remote service. This module may take the form of an interpreted program (known as a 'script'), typically expressed in Javascript language, integrated within a WEB page. In certain embodiments, typically for circumventing certain limitations for the network resources of the terminal in the access to the downloaded scripts, the software module may also be provided in the form of an extension module for the browser (known as a 'plugin'). Generally speaking in this case, downloading the plugin requires a validation by the user. This embodiment is the only one that requires an intervention by the user. The latter is then limited to this validation and is still much less involved than the installation of drivers. Alternatively, a mixed mode may also be used. In such a mode, a plugin can be used to provide the necessary network access functionalities. An interpreted software module (script) being introduced into the content of the service then uses these functionalities of the plugin. In this way, the transfer is automatic and transparent for the user. Advantageously, the script may be inserted into a 'hidden frame' different from the frame of the WEB content. Thus, the connection remains active during a change of page by the user.

Once this module has been downloaded, it is then executed by the software client on the user terminal. The module is then responsible for launching a phase for discovery of the security devices capable of fulfilling the complementary security function required by the secure remote service. This discovery phase typically consists in sending of discovery messages in broadcast mode including an identification of the network service sought. The latter is typically identified by its name. These messages are sent over all of the active network interfaces of the consultation terminal and hence over all of the local networks, physical and virtual, based on a USB interface or other interface, to which the latter is connected.

All the nodes of the network possessing the security network service identified in the discovery messages will respond to this message in the form of a response message sent back to the module downloaded onto the terminal. This response message typically contains the identification of the responding network node, of the available network service and, where appropriate, of complementary parameters linked to this network service.

The module receives all of the responses generated by the various nodes of network hosting a network service corresponding to the network service sought by the discovery phase. If no response is received, the secure remote service cannot access a required security network service and will not typically allow the access to its secure remote service or to some of its functionalities or resources. Several attempts may be made before determining the absence of a security network service. Advantageously, the security software module carries out a step for validating the security network services discovered. This validation may consist in an access test. In this case, the list of the network services discovered is reduced to the validated services. Data coming from all of the responses, or from the validated responses, are sent to the secure remote service. The latter selects one of the nodes that responded to the discovery. This selection is made according to the identity of the node having responded and, where relevant, as a function of the additional parameters supplied in the responses. The result of this selection is then sent back to the module downloaded on the consultation terminal. Two communications links are then established, a first between the secure remote service and the downloaded module and a second between the downloaded module and the selected security device, more precisely between the downloaded module and the security element incorporated into this module. The module then operates as a relay between these two links. This operation is typically carried out in a transparent and automatic manner. Thus, a direct communications link is established through these two links between the secure network service and the security element integrated into the security device. Advantageously, the data is encrypted over these links in order to provide a secure tunnel between the secure remote service and the security element. The encryption can be carried out at each of the connections and/or from end to end between the secure remote service and the security element.

Once the communication has been established between the secure remote service and the security element, the service can communicate with the latter for the needs of the service. These needs may be diverse and they depend on the secure remote service. Typically they comprise the authentication of the user by means of a digital certificate integrated into the security element. It may also comprise services for encrypting and decrypting by the security element or other depending on the secure remote service.

Thus, a connection is established between the secure remote service and a security element connected to a terminal for consulting said service. This connection is established without requiring the installation by the user of drivers specific to the security element or additional software applications on the terminal. It is established in a totally transparent manner or only requiring one validation by the user for the embodiment based on a plugin of the browser. It allows a high level of security to be brought to a secure remote service on the basis of one security element while at the same time preserving the ease of use of the secure remote service.

Figure 3:
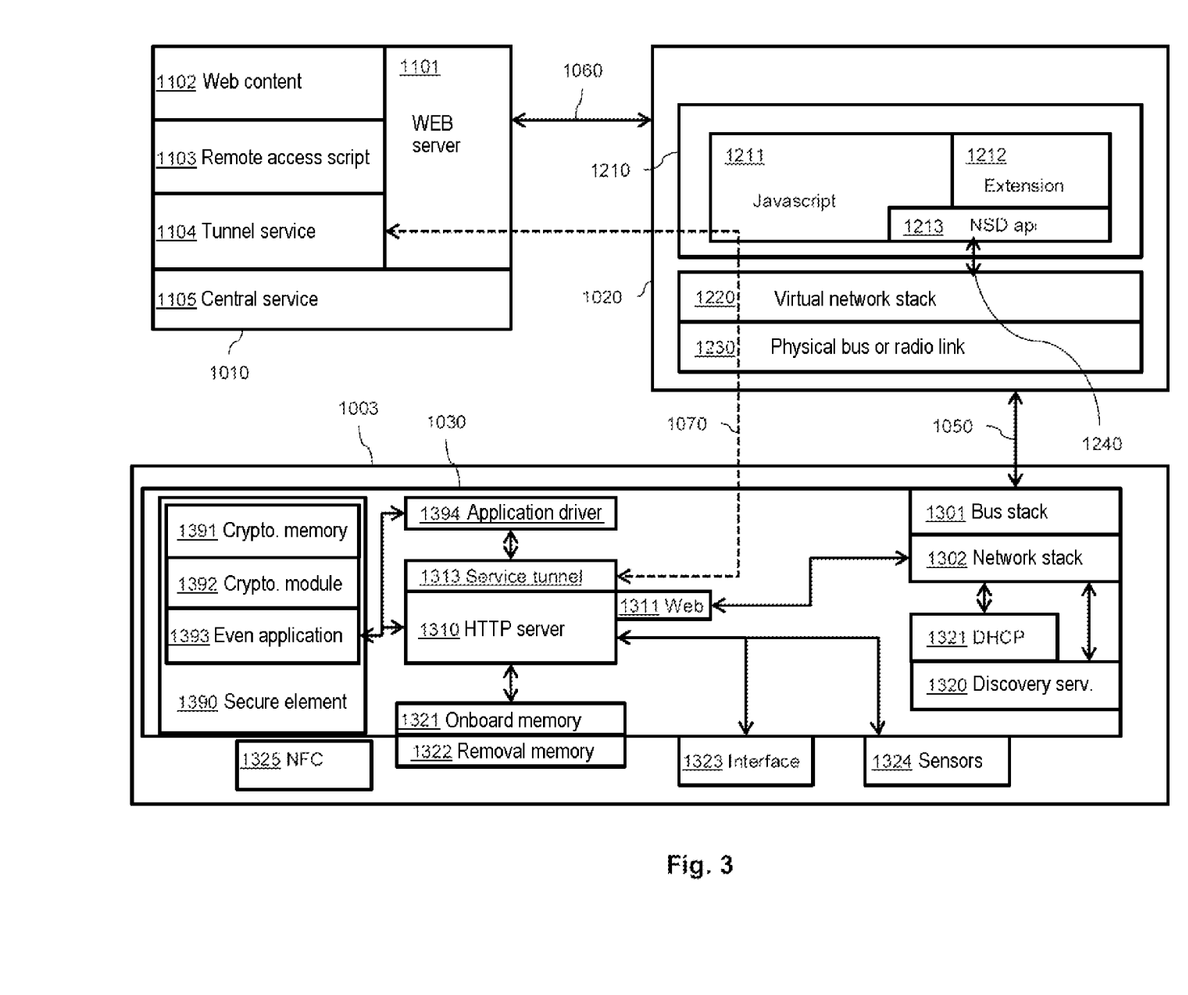
FIG. 3 illustrates the software architecture of the various elements of the system according to one embodiment of the invention.

FIG. 3 illustrates the software architecture of the various elements of the system according to one embodiment of the invention.

In this embodiment of the invention, the secure remote service 1010 is a WEB service hosted on one or more servers (or 'cluster') connected to a data network, typically the Internet. This secure remote service comprises a WEB server 1101 for receiving requests and generating response messages to these requests. The service hosts content 1102 designed to be used by the WEB server 1101 for generating its responses to the requests. This content defines the secure remote service offered. The secure remote service also comprises a discovery software module 1103 according to the invention typically written in interpreted language or script for managing the remote access. The secure remote service also comprises a service 1104 for the establishment and the management of encrypted communications or tunnels with third parties over the Internet network. The secure remote service is managed by a central service 1105 (or 'backend') which is responsible, amongst other things, for the management of the user accounts and of their rights of access to all or part of the secure remote service.

The consultation terminal 1020 comprises a browser 1210. This is typically a WEB browser, such as Opera (registered trademark), Safari (registered trademark), Firefox (registered trademark), Internet Explorer (registered trademark) or other. This browser is used as a client for consulting the secure remote service 1010. It typically comprises a script interpreter 1211, typically a Javascript engine, allowing it to execute locally on the terminal software modules downloaded from a service WEB, for example the discovery module 1103. It may also comprise, in some embodiments, a module 1212 for management of extensions. These extensions are software modules that it is possible to download and which will interface with the browser. These extension modules or plugins will enrich the functionalities of the browser. In some embodiments, the discovery module 1103 may be offered in the form of such a plugin. Advantageously, the browser incorporates a software interface (or API for Application Programming Interface) NSD (for Network Service Discovery) such as defined by the W3C consortium (for World Wide Web Consortium). This software interface allows the management of network services discovery packets over the various network interfaces active on the terminal. FIG. 3 illustrates the network stack 1220, typically a virtual network stack implemented over the physical link 1230 connecting the terminal and the security device. The browser communicates with the network stack via the link 1240. For example, in the case of a USB connection of the security device, the USB standard incorporates an Ethernet emulation which may be used to advantage by network stacks integrated into operating systems such as Linux (registered trademark) or Mac OS (registered trademark). In the case of the Windows (registered trademark) operating system, an RNDIS (Remote Network Driver Interface Specification) module allows the same service to be offered. These stacks are supported by default by the operating systems. This communication network may also be based on a radio link such as Bluetooth with BT-PAN (Personal Area Networking) or else directly via Wifi. According to the embodiment, this interface network may be common with the interface network, typically Wifi or Ethernet, used by the terminal for accessing the Internet, or it may be different, typically in the USB or Bluetooth case.

The security device 1003 comprises a whole set of integrated components 1030. This set comprises a security element 1390 which comprises secure memory for the cryptographic keys 1391, a cryptographic calculation module 1392 and an application (Applet type) responsible for the implementation of the functionalities of the network service. This are the security functionalities required by the secure remote service and offered in the form of a detectable network service. The security device also comprises a driver 1394 for the management of the functionalities of the application 1393. This application can communicate with a service for management 1313 of a secure connection or tunnel. Advantageously, the device also comprises an internal WEB server 1310 coupled with a server 1311 typically supporting the CORS (Cross-Origin Resource Sharing) process as detailed hereinbelow. The security device comprises integrated memory 1321 used in the operation of these software modules. Advantageously, it can also have a removable memory module 1322 allowing its capacities to be increased. It could also dispose of a man-machine interface 1323. This interface typically comprises a screen and/or a series of LED indicators allowing information to be indicated to the user. It may also comprise a set of buttons allowing the latter to interact with the device. In such a manner as to allow an additional authentication of the user, the device may be equipped with biometric sensors 1324, such as a fingerprint reader, an iris reader or other sensor system. Advantageously, the device also comprises a near-field radio communications module of the NFC type 1325. For the communication with other devices, typically the consultation terminal, the security device disposes of a physical interface 1301 which is generally the same thing as the physical interface of the terminal 1230. This physical interface supports a network stack 1302 which is also typically the same thing as the network interface 1220 of the terminal. The same technologies as those described for the terminal can be used here. Advantageously, the device comprises a dynamic configuration server DHCP 1321 which allows the configuration of the local network created between the consultation terminal and the security device. This is particularly useful when the consultation terminal and the security device communicate by establishing a virtual local point-to-point network which is the case during the use of Bluetooth or USB technology for example. In the case where the security device and the consultation terminal are connected via a pre-existing local network, typically the case for a Wifi network, the Wifi point of access can then manage the network configuration of the security device. Finally, the security device disposes of a discovery service 1320 which allows it to receive and to respond to discovery requests. This security device may be implemented in the form of a specific device. In some embodiments, it may also be a smartphone incorporating a security element or connected, for example via a NFC link, to a security element.

The security network service is then typically implemented in the form of an application running on the telephone. This telephone can connect to the terminal via Wifi or Bluetooth, technologies which are commonly implemented in today's telephones, or USB technology also commonly implemented in telephones.

The consultation terminal is connected to the remote service via a communications link 1060, typically an Internet connection. It is also connected to the secure device via a local network link 1050. A secure connection or tunnel 1070 is established by the method according to the invention between the tunnel service 1104 of the remote service and the tunnel service 1313 of the secure device going via the downloaded software module 1103 and typically executed by the JavaScript module 1211.

Figure 4:
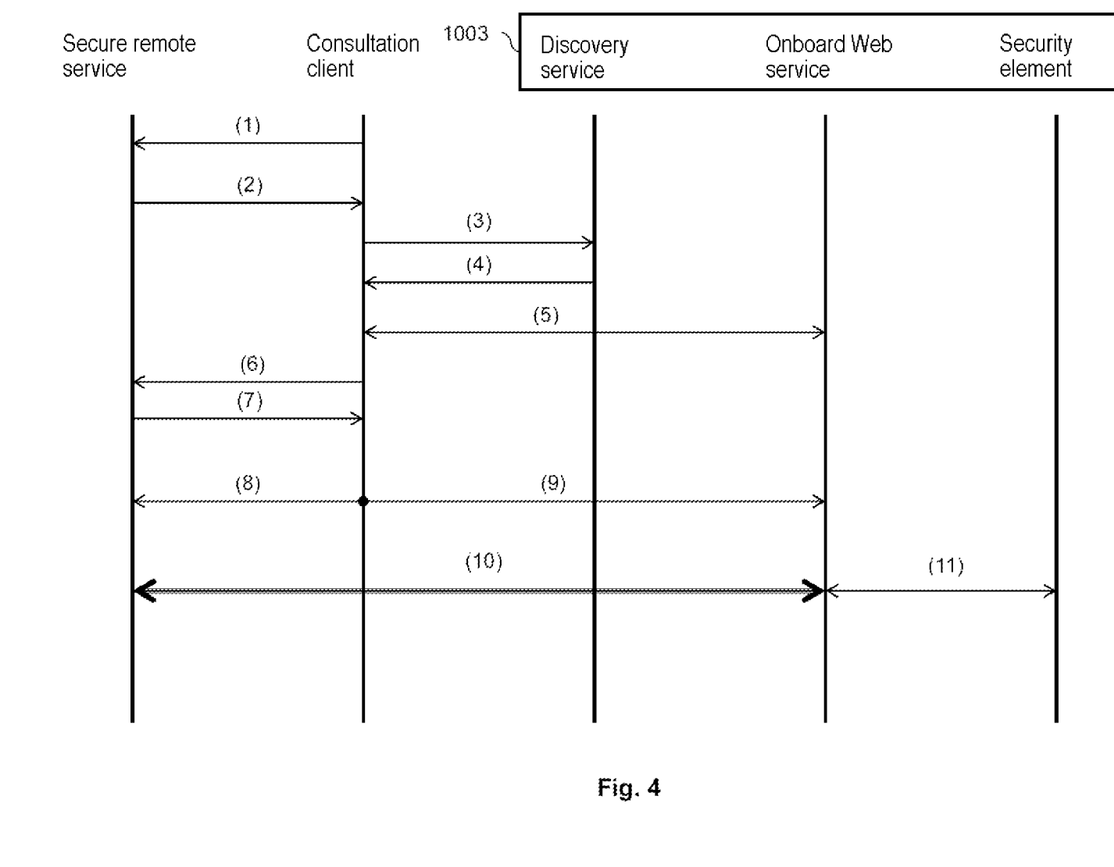
FIG. 4 illustrates the exchanges between the elements of the system during the establishment of a secure connection between the secure remote service and the secure element according to one embodiment of the invention.

FIG. 4 illustrates the exchanges between the elements of the system during the establishment of a secure connection between the secure remote service and the secure element according to one embodiment of the invention. These exchanges take place between the secure remote service, the consultation client executed by the consultation terminal and the security device 1003. Within the security device, the exchanges are described between the discovery service, the onboard WEB service and the security element.

During a consultation of the secure remote service by the consultation client from the consultation terminal, a request (1) is sent by the consultation client to the secure remote service. This request (1) makes use of resources or of a functionality within the secure remote service requiring a security operation. This security operation may, for example, be an authentication of the user, a digital signature operation or an encryption operation or decryption operation. In order to be able to execute this security operation, the secure remote service requires the service of the secure element integrated into the security device. This request (1) is typically an HTTP or HTTPS request. The injection of the discovery software module may be implemented on demand when the security functionality is required or right at the start of the consultation so as to be available subsequently and thus to improve the response time. It may happen that, in certain cases, the discovery software module is already present; for example, it may have been downloaded during a previous access to a resource requiring the security network service.

The discovery software module is then downloaded onto the consultation terminal within the consultation client during the step (2). This download is typically implemented by an insertion of the module in interpreted language into a page of the WEB content served by the remote service. It may also consist of the offer of installation of the discovery software module in the form of a plugin or else of a combination between a module in interpreted language and a plugin completing it. Once downloaded, this discovery software module is executed by the consultation client.

In order to be able to operate, the discovery module software must be able to access a programming interface allowing discovery packets to be sent to the local networks connected to the terminal. This interface can typically be the interface NSD 1213 in FIG. 3. If the module identifies that it does not have this access, it may then propose the download of a plugin offering the same functionalities as the discovery software module and which is not subject to the same limitations as a module interpreted by the consultation client.

The discovery module then launches a discovery phase on all of the active network interfaces of the consultation terminal. This discovery phase consists in sending discovery messages (3) in broadcast mode over all of these networks. The discovery message is then received by the security device 1003 and is managed by the discovery service. The discovery service then responds to the discovery request by the message (4) which contains the parameters relating to the security network service implemented by the device and on the manner in which to connect to it. These parameters typically comprise the name of the network service, its IP address and an associated port number. Advantageously, these parameters incorporate a cryptographic key that can used to render the communication with the security device secure. The response message may, for example, be sent by a CORS AJAX call to the onboard WEB server.

Once the consultation client has collected all of the responses, the latter are passed to the discovery software module which therefore possesses a list of the nodes of the network which have the security network service sought together with a means of accessing it. This means typically consists in an IP address and an associated port number potentially associated with the name of the service.

Advantageously, the discovery software module then carries out a step for pre-selection of the discovered network services. For this purpose, it tries to access these services, which are the exchanges (5) in FIG. 4. Owing to the security policy generally integrated into modern browsers which prohibit HTTP requests from going outside of their domain, the security network service might not be accessible. This limitation may be circumvented by the use of a HTTP request using CORS (for Cross-Origin Resource Sharing) technology. This requires the server HTTP integrated into the device to be compatible with this technology. In the opposite case, the requests cannot succeed and trigger the display of an error message.

The security network services not compatible with the CORS technology are then removed from the list of the available security network services. The same is true for services which have not responded to the request for access. Generally speaking, this access attempt allows the accessibility of the security network service to be verified. The tests effectively carried out may vary depending on the embodiments of the invention.

This verification procedure may include a negotiation in order to determine a cryptographic key that can be used for encrypting the communications between the secure remote service and the security device. It is then assumed that the security device comprises this shared secret typically stored in the security element. The procedure for sharing this secret is not described in this document. Where relevant, the results of the verification procedure are then added to the description of the acceptable security network services.

This list is then sent back to the secure remote service during the step (6). This may be done, for example, in the form of an AJAX POST request sent to the server which transfers the information to the central service managing the secure remote service.

Advantageously, a step for verification of the network services received is then carried out by the secure remote service. A selection of one of these services is applied. This selection is based on the parameters acquired accompanying the list of the available network services. Potentially, this selection may be based on the verification of a signature contained within these parameters. The selected service is then communicated to the discovery software module in the step (7), for example by sending its index in the list of the network services discovered. Advantageously, a unique identifier is generated and also communicated; this identifier is also stored in memory by the tunnel service 1104 FIG. 3 of the secure remote service. It will be able to be used in conjunction with the cryptographic key negotiated for the establishment of the secure connection.

When it receives the selected secure network service, the discovery software module switches into an operational mode. It then establishes two persistent connections. A first persistent connection is established with the tunnel service of the secure remote service (8) and a second connection is established with the tunnel service of the secure device (9). Advantageously, these connections are encrypted by means of the cryptographic key negotiated in such a manner as to form a secure tunnel between the security device and the secure remote service. When these two connections have been successfully established, the discovery software module operates as a simple relay between the two connections.

These connections may be implemented, for example, by using the WebSocket technology, standardized in the RFC 6455, integrated into modern browsers. This technology supplies asynchronous bidirectional communications compatible with WEB technologies such as HTTP or HTTPS. It can be used to open persistent links between a client and a server in situations where AJAX technologies offer oriented communications, non-persistent character chains and only on the initiative of the client.

A virtual direct link (10) is thus created between the secure remote service and the security device and, more precisely, the WEB service installed on board the latter. The onboard WEB service is itself connected via the link (11) with the integrated security element, it communicates with the even application 1393 FIG. 3. The communications can now take place on the initiative of the secure remote service in order to carry out the security operation or operations required by this service. The secure remote service is able to exploit the cryptographic functions of the security element integrated into the security device in order to performing operations such as authentication, signature, encryption or any other desired operation. These exchanges may be based on the standard protocol for accessing a secure APDU element defined by the ISO7816 standard.

Certain requests from the secure remote service might not require the direct access to the secure element but only, for example, to request an authentication of the user by the use of a biometric sensor integrated into security device. In this case, the request is directly interpreted by the onboard WEB server.

In one particular embodiment, the discovery software module is not injected into the normal content of the service. The content is then encapsulated within a full-size browser frame, whereas the software module is encapsulated within a hidden framework. This allows the discovery software module and hence the tunnel between the secure remote service and the security device to survive a change of page during browsing.

In another particular embodiment, the discovery software module is inserted normally into a WEB content. When the connection is established, the discovery software module uses the DOM (for Document Object Model) storage functionality in order to store the connection information in local memory on the consultation terminal. This DOM storage technology offered by HTML 5 allows the WEB applications to have a space available for local storage on the consultation terminal. This connection information typically comprises a session identifier, together with the IP addresses and associated ports, for re-establishing the connection. Thus, when the user leaves the current page, the connection is lost. When he/she comes back to it, the discovery software module can re-establish the connection using the stored connection information without having to restart the whole from scratch. Advantageously, in order to avoid a malicious usage of the connection information, the secure remote service implements a timer invalidating the session identifier after a given period of time. It may also invalidate an attempt to establish the connection coming from another browsing session.

Naturally, in order to satisfy specific requirements, a person skilled in the field of the invention will be able to apply modifications to the preceding description.

Although the present invention has been described hereinabove with reference to specific embodiments, the present invention is not limited to the specific embodiments, and the modifications which are in the field of application of the present invention will be obvious to those skilled in the art.

The invention claimed is:

1. A method for establishing a connection between a security network service hosted by a security device connected to a consultation terminal and a remote service during the consultation of said remote service by said consultation terminal, comprising:

transmitting, from the remote service, a discovery software module to the consultation terminal, in response to a request sent by said consultation terminal;

executing the discovery software module received from the remote service on said consultation terminal, said executed discovery software module performing steps of:

discovering one or more security network services available on a local network and hosted by the security device connected to the consultation terminal, validating the one or more security network services by carrying out an attempt to connect to each one of the one or more security network services, and for each one of the security network services for which said attempt carried out is successful, indicating the one of the security network services corresponding to the successful attempt as a validated network service, sending, to the remote service, a list containing only validated discovered security network services discovered and validated by the discovery software module, receiving information designating a validated discovered security network service, selected by said remote service from said sent list of validated discovered security network services, as a selected security network service, establishing a first connection between said consultation terminal and the selected security network service, and establishing a second connection between said consultation terminal and the remote service; and causing the discovery software module to operate as a relay between the first connection and the second connection so that said relay functions as a tunnel between the remote service and the selected security network service.

2. The method according to claim 1, wherein, in attempting to connect to each one of the one or more discovered security network services, the received discovery software module, executed on said consultation terminal, receives a set of parameters and adds the received parameters to the list of discovered security network services.

3. The method according to claim 1, further comprising: storing, on the terminal, parameters for establishing the first and second connections.

4. The method according to claim 1, wherein the first and second connections established by the received discovery software module executed on said consultation terminal are encrypted.

5. The method according to claim 1, further comprising:
encrypting the first and second connections from end to end by the remote service and the selected security network service.

6. The method according to claim 1, wherein, in transmitting the discovery software module, the discovery software module is inserted into a WEB page in the form of an interpreted program.

7. The method according to claim 6, wherein the discovery software module is inserted into a hidden framework.

8. The method according to claim 1, wherein, in transmitting the discovery software module, the discovery software module is in the form of a plugin for a WEB browser.

9. The method according to claim 1, wherein the one of the one or more security network services is hosted on a mobile telephone.

10. A non-transitory data storage medium having stored thereon information, readable by a computer, comprising coded instructions of a computer program that, upon execution by a processor device having a memory and a communications interface connected thereto, causes the processor device to execute steps comprising:
transmitting, from a remote service, a discovery software module to a consultation terminal, in response to a request sent by said consultation terminal;
executing, at said consultation terminal, the discovery software module received from the remote service, causing said discovery software module including coded instructions of the computer program to:
discover one or more security network services available on a local network and hosted by a security device connected to the consultation terminal,
validate the one or more security network services by
carry out an attempt to connect to each one of the one or more security network services, and for each one of the security network services for which said attempt carried out is successful, indicating the one of the security network services corresponding to the successful attempt as a validated network service,
send, to the remote service, a list containing only validated discovered security network services discovered and validated by the discovery software module,
receive information designating a validated discovered security network service, selected by said remote service from said sent list of validated discovered security network services, as a selected security network service,
establish a first connection between said consultation terminal and the selected security network service, and
establish a second connection between said consultation terminal and the remote service; and
cause the discovery software module to operate as a relay between the first connection and the second connection so that said relay functions as a tunnel between the remote service and the selected security network service.

* * * * *